United States Patent [19]

Rosenberg

[11] Patent Number: 5,144,980

[45] Date of Patent: * Sep. 8, 1992

[54] FLUID FLOW CONTROL APPARATUS

[76] Inventor: Peretz Rosenberg, Moshav Beit Shearim, Israel

[*] Notice: The portion of the term of this patent subsequent to Aug. 8, 2008 has been disclaimed.

[21] Appl. No.: 591,632

[22] Filed: Oct. 2, 1990

[30] Foreign Application Priority Data

Dec. 1, 1989 [IL] Israel .......................................... 92515

[51] Int. Cl.[5] .............................................. F16K 21/16
[52] U.S. Cl. ................................. 137/624.14; 137/474
[58] Field of Search .................. 137/494, 624.14, 474, 137/469, 516–525, 508

[56] References Cited

U.S. PATENT DOCUMENTS

| | | | |
|---|---|---|---|
| 906,285 | 12/1908 | Von Post | 137/624.14 X |
| 3,826,280 | 7/1974 | Perham | 137/624.14 |
| 4,781,217 | 11/1988 | Rosenberg | 137/624.14 |
| 4,889,154 | 12/1989 | Rosenberg | 137/474 |
| 4,949,747 | 8/1990 | Rosenberg | 137/624.14 X |

FOREIGN PATENT DOCUMENTS 17193  4/1913  Denmark ........................ 137/624.14

Primary Examiner—Stephen M. Hepperle

[57] ABSTRACT

A fluid flow control apparatus particularly useful as an automatic shut-off valve includes an arrangement which vents the interior of the valve to the atmosphere before the valve is closed by a membrane seating against a valve seat, thereby preventing the possibility of the valve stabilizing in a partially-open condition.

19 Claims, 2 Drawing Sheets

FLUID FLOW CONTROL APPARATUS

FIELD AND BACKGROUND OF THE INVENTION

The present invention relates to fluid flow control apparatus. The invention is particularly useful as an automatic shut-off valve, such as described in my prior U.S. Pat. Nos. 4,889,154 and 4,949,747, and is therefore described below with respect to such a valve.

The above patents describe automatic shut-off valves which open at a relatively high pressure and close at a relatively low pressure. Such valves are particularly useful in water pulsator devices including a housing having an inlet port formed with a restricted inlet orifice for receiving fluid in a continuous manner and at relatively low rate, and an outlet port formed with a larger orifice controlled by an outlet valve of the type described above, which opens at a relatively high pressure and closes at a relatively low pressure. Thus, water may be continuously introduced at a low rate into the housing, thereby increasing the pressure within the housing until the outlet valve opens, the opening of the outlet valve effecting a rapid discharge of the water thereby dropping the pressure within the housing until the outlet valve recloses.

One of the problems experienced in shut-off valves of the foregoing type particularly when used in water pulsator devices is the possibility that the outlet valve may partially open to discharge the fluid at a low rate and stabilize in this partially open condition. If this should occur, the device will continuously discharge the water at a low rate and therefore cease to act as a pulsator device.

OBJECTS AND BRIEF SUMMARY OF THE INVENTION

An object of the present invention is to provide fluid flow control apparatus including a quick-action valve assembly which prevents, or substantially reduces, the possibility that the valve will stabilize in a partially open condition. Another object of the invention is to provide a valve assembly of the type described, which opens at a relatively high pressure and closes at a relatively low pressure, and which eliminates or substantially reduces the possibility of stabilizing in a partially open position.

According to the present invention, there is provided fluid flow control apparatus including a housing having an inlet circumscribed by an inlet valve seat, and an outlet; and a movable valve assembly cooperable with the inlet for controlling the fluid flow therethrough to the outlet. The movable valve assembly comprises a displaceable member movable to an open or to a closed position within the housing and defining an inlet chamber therewith communicating with the housing inlet, and a hollow tube assembly passing through the displaceable member and movable therewith. The hollow tube assembly has, on one side of the displaceable member, an inlet end and a passageway therethrough communicating with the inlet chamber, and an outlet end on the other side of the displaceable member. The assembly further includes a deformable membrane carried by the inlet end of the hollow tube assembly and engageable with the inlet valve seat. The membrane is normally flat and spaced from the inlet end of the hollow tube assembly to connect the inlet end to the inlet chamber, but is deformable by the inlet pressure to a curved configuration into engagement with the inlet opening of the hollow tube assembly and thereby to disconnect the inlet end from the inlet chamber.

As will be more apparent from the description below, the pressure in the inlet chamber is thus vented through the outlet before the valve is closed by the membrane seating against the inlet valve seat, thereby preventing the possibility of the valve assembly stabilizing in a partially-open condition.

In the described preferred embodiment, the displaceable member is a piston, and has a surface area larger than that of the inlet valve seat. The movable valve assembly thus opens the housing inlet at a relatively high inlet pressure and closes the housing inlet at a relatively low inlet pressure, thereby making the apparatus particularly useful in a pulsator device as described above.

According to further features in the described preferred embodiment, the inlet valve seat is in the form of an annular rib formed in a wall of the housing. The hollow tube assembly includes an annular extension circumscribing the membrane and the annular rib of the inlet valve seat, and is dimensioned to engage the wall of the housing in the closed condition of the movable valve assembly to thereby protect the deformable membrane from damage.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Figure 1:
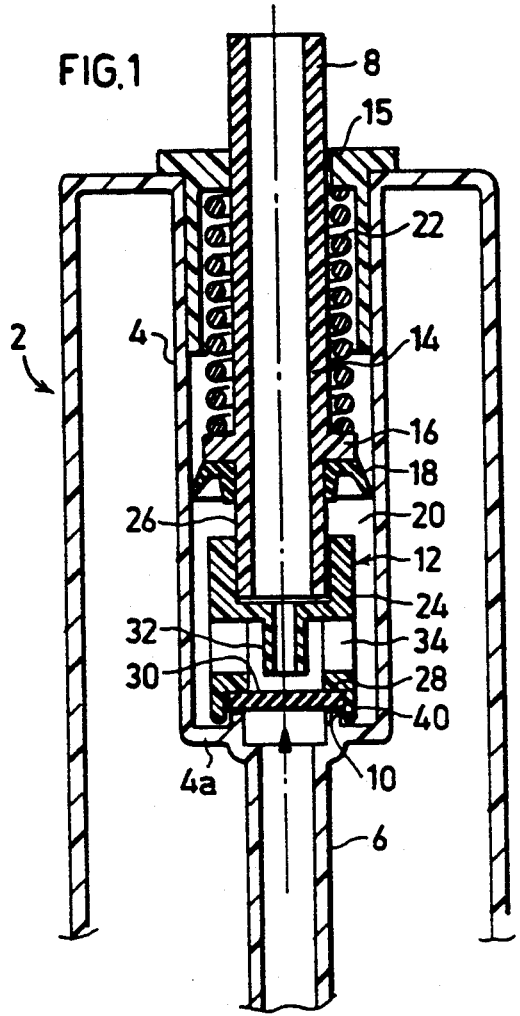
FIGS. 1-4 are longitudinal sectional views illustrating one form of apparatus constructed in accordance with the present invention and showing the various conditions of the valve assembly when moving from its fully closed to its fully open position.

The apparatus illustrated in the drawings is particularly useful as the outlet valve assembly in the pulsator device described in my Patent 4,781,217. It includes an outer housing 2 serving as a reservoir for the accumulation of water introduced via an inlet (not shown) at a low rate, and an inner housing 4 containing the valve assembly of the present invention which opens at a high inlet pressure, and closes at a lower inlet pressure, thereby discharging the water accumulated within the outer housing 2 in the form of pulses.

More particularly, the inner housing 4 is formed with an inlet 6 communicating with the water within the outer housing 2, and an outlet 8 through which the water is discharged (e.g., to a sprinkler) in the form of pulses. The inlet 6 is circumscribed by an inlet valve seat 10, which cooperates with a movable valve assembly, generally designated 12, for controlling the water flow through the inlet 6 to the outlet 8.

The movable valve assembly 12 includes a hollow tube 14 extending through a collar 15 in the end wall of the outer housing 2, the outer end of tube 14 serving as the outlet 8. Tube 14 is formed with an annular flange 16 in the section thereof within the inner housing 4. A displaceable member in the form of a piston 18 is received on the inner side of flange 16 and engages the inner face of the inner housing 4 so as to define an inlet chamber 20. A coiled spring 22 is interposed between the outer face of flange 16 and collar 15, so as to urge the hollow tube 8, together with its piston 18, towards the inlet valve seat 10.

The movable valve assembly 12 further includes a cap 24. Its side facing away from the inlet valve seat 10 is formed with a bore 26 which receives the inner end of the hollow tube 8 with a friction fit. The opposite side of cap 24 is formed with an annular recess 28 receiving a deformable membrane 30 which is normally urged by spring 22 into engagement with the inlet valve seat 10.

Figure 2:
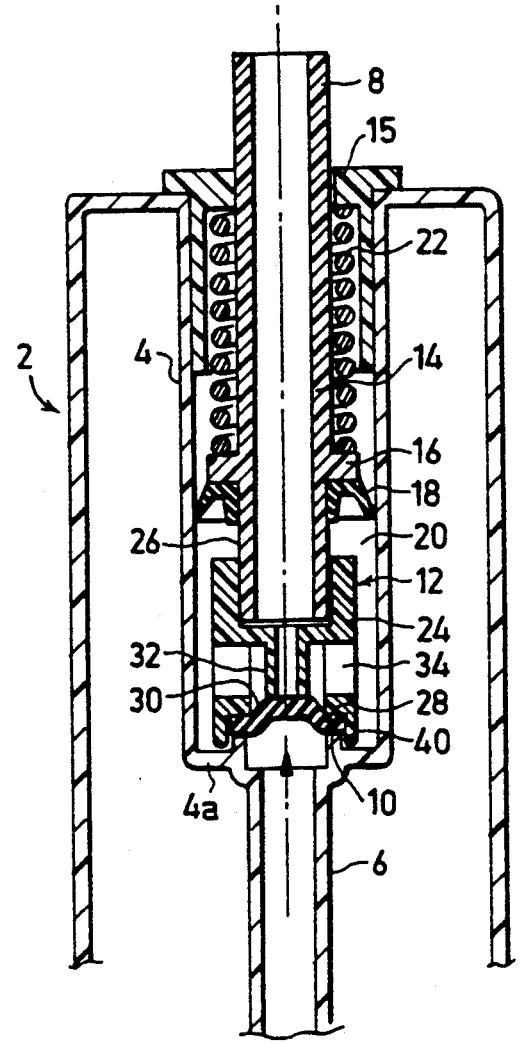
Figure 3:
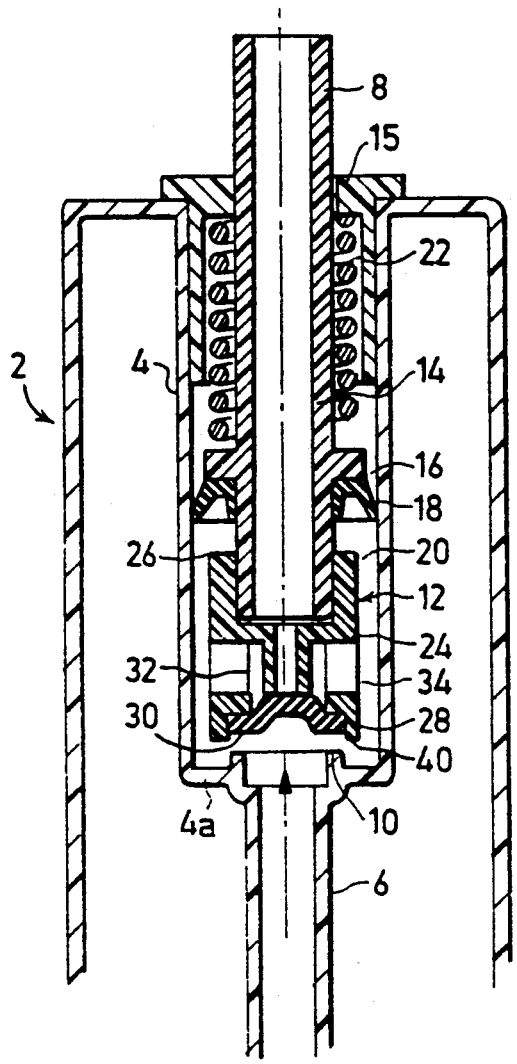

Cap 24 is further formed with a hollow stem 32 of smaller inner and outer diameter than hollow tube 8. Hollow stem 32 terminates inwardly of membrane 30 so as normally to be spaced from that membrane. The cap is further formed with radial openings 34 substantially aligned with the hollow stem 32 so as to provide a passageway joining the interior of hollow stem 32 with the inlet chamber 20 when membrane 30 is in its normal, flat condition, as illustrated in FIG. 1. Membrane 30, however, is deformable to a curved shape, as illustrated in FIGS. 2 and 3, during the operation of the apparatus, as will be described below, to interrupt this communication between the interior of stem 32 and the inlet chamber 20.

The inlet valve seat 10 is defined by an annular, axially-extending rib formed in the end wall 4a of the inner housing 4. The end of cap 24 of the movable valve assembly 12, circumscribing membrane 30, projects axially as shown at 40 to circumscribe the valve seat rib 10 in the closed condition of the valve assembly and to engage the inner face of the housing wall 4a. The dimensions of the foregoing elements are such that projection 40 engages the inner face of housing wall 4a to permit the inlet valve seat rib 10 to engage membrane 30 with a sufficiently light pressure to block the flow of the water into chamber 20, but not to unduly press against the membrane so as to damage it in the closed condition of the valve assembly (FIG. 1).

The cross-sectional area of piston 18 is substantially larger than the cross-sectional area of the inlet valve seat 10. This causes the valve assembly to move to its open condition under a high inlet pressure, but to move back to its closed condition under a lower inlet pressure.

OPERATION

The operation of the apparatus will now be described with particular reference to the sequence illustrated in FIGS. 1-4.

Thus, FIG. 1 illustrates the apparatus in the fully-closed condition of the valve assembly 12 when no inlet pressure is applied to the inlet 6. Thus, the assembly is urged by spring 22 to cause membrane 30 to firmly engage the inlet valve seat 10, and to close the inlet to the flow of water into the inlet chamber 20. In the absence of an inlet pressure, membrane 30 is in its flattened condition, spaced from the tip of hollow stem 32, so that the outlet 8 communicates with chamber 20 via passageways 34, the interior of hollow stem 32, and hollow tube 14. Accordingly, any pressure within chamber 20 will be vented to the atmosphere via stem 32 and outlet 8.

When the water at the inlet 6 starts to become pressurized, the inlet pressure will cause membrane 30 to deform to the curved shaped illustrated in FIG. 2, wherein it engages the outer tip of stem 32, thereby interrupting the communication between chamber 20 and the outlet 8 via the hollow tube 14. This is the condition illustrated in FIG. 2.

As the inlet pressure applied to membrane 30 increases, the inlet pressure moves valve assembly 12 away from the inlet valve seat 10, against the force of spring 22, thereby opening the valve inlet to the flow of water into chamber. At first, membrane 30 is still in its deformed curved condition, as illustrated in FIG. 3, blocking the flow of water from inlet chamber 20 into the hollow stem 32 and hollow tube 14 to the outlet 8. However, as the pressure within chamber 20 increases towards that at the inlet 6, membrane 30 returns to its normal flat condition, spaced from the tip of the hollow stem 32, so that the water is now permitted to flow continuously from inlet 6 via chamber 20, hollow stem 32, and hollow tube 14, through the outlet 8 of the outer housing 2.

As soon as membrane 30 disengages from the inlet valve seat 10 and starts to move to the fully-open condition of the valve assembly, the inlet pressure is applied to piston 18. Since that piston is of substantially larger cross-sectional area than valve seat 10, the inlet pressure will apply a substantially larger force to the valve assembly 12 to forcefully move it to its fully open position and to retain it in the open position.

When the inlet pressure drops an appreciable amount below that opening the valve assembly, that is to the point where it, applied to the larger surface area of piston 18, is no longer able to retain the valve assembly in its open condition against the force of spring 22, the spring will move the valve assembly towards the inlet valve seat 10.

Figure 4:
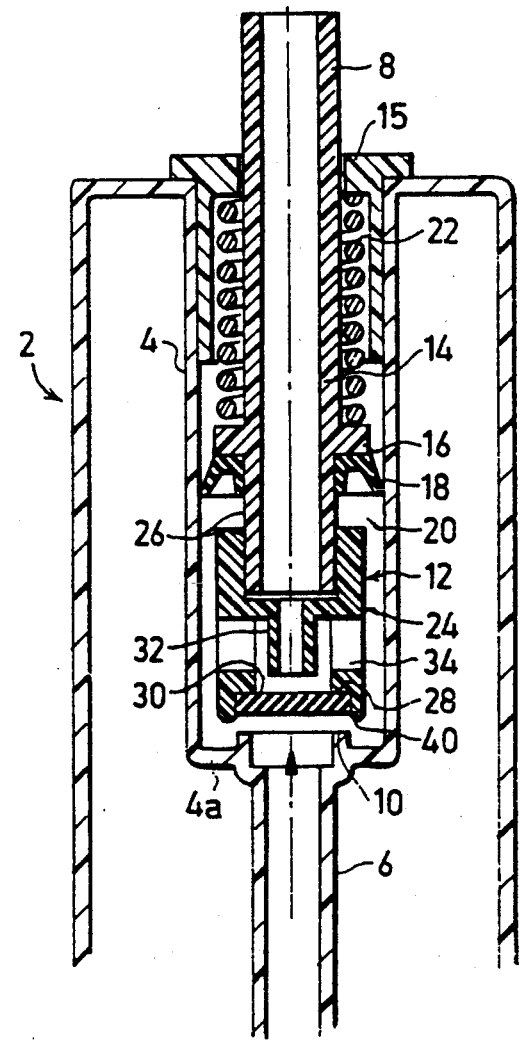

During this closing movement of the valve assembly, membrane 30 will be in its normal flattened condition, as illustrated in FIG. 4, thereby maintaining the communication between the inlet chamber 20 and the outlet 8 via hollow stem 32, until membrane 30 engages the inlet valve seat 10, to close the inlet 6. The presents any build-up pressure within chamber 20, since that chamber is vented to the atmosphere 8.

It will thus be seen that during the opening of the valve assembly, the communication between the inlet chamber 20 and the outlet 8 is terminated (by the deformation of membrane 30, FIG. 2) before the inlet is opened, and that during the closing of the valve assembly, this communication between chamber 20 and the outlet 8 is maintained until after membrane 30 engages the inlet valve seat 10 to close the inlet. This arrangement thus prevents any build-up of pressure within chamber 20 which might cause the valve assembly to stabilize in a partially-open or "leaking" condition.

It will also be seen that when the valve assembly is in its closed condition, as illustrated in FIG. 1, the annular extension 40 of cap 24, which circumscribes the annular rib defined by the inlet valve seat 10, engages the housing wall 4a to permit membrane 30 to firmly engage the annular valve seat, but to prevent undue pressure against the membrane which might damage it.

It will be further seen that since the cross-sectional area of piston 18 is much larger than the cross-sectional area of the inlet valve seat 10, a large inlet pressure is required to open the valve assembly, but a smaller inlet pressure will close the valve assembly, the ratios of the two inlet pressures being defined by the relative ratios of the surface area of piston 18 with respect to that of the inlet valve seat 10.

As one example, the parts may be designed so that membrane 30 is deformed to its curved configuration illustrated in FIG. 2 at an inlet pressure of 15 psi, moves the valve assembly 12 to the open position illustrated in FIGS. 3 and 4 at a pressure of about 20 psi, and remains open until the inlet pressure drops to about 6 psi.

While the invention has been described with respect to one preferred embodiment for use in a pulsator device, it will be appreciated that the invention could advantageously be used in other applications, such as a conventional shut-off valve providing clear and definite opening and closing of the valve. Many other variations, modifications and applications of the invention will be apparent.

WHAT IS CLAIMED IS:

1. Fluid flow control apparatus including: a housing having an inlet circumscribed by an inlet valve seat, and an outlet; and a movable valve assembly cooperable with said inlet for controlling the fluid flow therethrough to the outlet; said movable valve assembly comprising:
    a displaceable member movable to an open or to a closed position within said housing and defining an inlet chamber therewith communicating with said housing inlet;
    a hollow tube assembly passing through said displaceable member and movable therewith;
    said hollow tube assembly having, on one side of said displaceable member, an inlet end and a passageway therethrough communicating with said inlet chamber, and an outlet end on the other side of said displaceable member;
    and a deformable membrane carried by said inlet end of the hollow tube assembly and engageable with said inlet valve seat;
    said membrane being normally flat and spaced from said inlet end of the hollow tube assembly to connect said inlet end to said inlet chamber, but being deformable by the inlet pressure to a curved configuration into engagement with the inlet opening of the hollow tube assembly and thereby to disconnect said inlet end from said inlet chamber.

2. The apparatus according to claim 1, wherein said displaceable member is a piston.

3. The apparatus according to claim 1, wherein said displaceable member has a surface area larger than that of the inlet valve seat to thereby cause the movable valve assembly to open the housing inlet at a high inlet pressure and to close the housing inlet at a lower inlet pressure.

4. The apparatus according to claim 1, wherein said inlet valve seat is in the form of an annular rib formed in a wall of the housing, said hollow tube assembly including an annular extension circumscribing said membrane and said annular rib of the inlet valve seat, and dimensional to engage said wall of the housing in the closed condition of the movable valve assembly to protect the deformable membrane from damage.

5. The apparatus according to claim 1, wherein said displaceable member is spring-urged to close the housing inlet.

6. The apparatus according to claim 1, wherein said hollow tube assembly comprises a hollow tube passing through said displaceable member, and a cap fixed to the hollow tube at said inlet end of the hollow tube assembly, said cap being formed with a hollow stem of smaller diameter than said hollow tube and engageable by said membrane when in its curved deformed condition.

7. The apparatus according to claim 6, wherein said cap is further formed with said passageway establishing communication between the inlet end of the stem and said inlet chamber when the membrane is in its flat undeformed condition.

8. The apparatus according to claim 7, wherein said cap is further formed with an annular recess for receiving said deformable membrane.

9. The apparatus according to claim 6, wherein said hollow tube is further formed with an annular flange on the outlet side thereof engageable with said displaceable member.

10. The apparatus according to claim 9, wherein said spring is interposed between said flange and said housing for urging said movable valve assembly to its closed position with respect to said housing inlet.

11. Fluid flow control apparatus including: a housing having an inlet circumscribed by an inlet valve seat, and an outlet; and a movable valve assembly cooperable with said inlet for controlling the fluid flow therethrough to the outlet; said movable valve assembly comprising:
    a piston movable to an open or to a closed position within said housing and defining an inlet chamber therewith communicating with said housing inlet;
    a hollow tube assembly passing through said displaceable member and movable therewith;
    said hollow tube assembly having, on one side of said piston, an inlet end and a passageway therethrough communicating with said inlet chamber, and an outlet end on the other side of said piston;
    and a deformable membrane carried by said inlet end of the hollow tube assembly and engageable with said inlet valve seat;
    said membrane being normally flat and spaced from said inlet end of the hollow tube assembly to connect said inlet end to said inlet chamber, but being deformable by the inlet pressure to a curved configuration into engagement with the inlet opening of the hollow tube assembly and thereby to disconnect said inlet end from said inlet chamber.

12. The apparatus according to claim 11, wherein said piston has a surface area larger than that of the inlet valve seat to thereby cause the movable valve assembly to open the housing inlet at a high inlet pressure and to close the housing inlet at a lower inlet pressure.

13. The apparatus according to claim 11, wherein said inlet valve seat is in the form of an annular rib formed in a wall of the housing, said hollow tube assembly including an annular extension circumscribing said membrane and said annular rib of the inlet valve seat, and dimensional to engage said wall of the housing in the closed condition of the movable valve assembly to protect the deformable membrane from damage.

14. The apparatus according to claim 11, wherein said displaceable member is spring-urged to close the housing inlet.

15. The apparatus according to claim 11, wherein said hollow tube assembly comprises a hollow tube passing through said piston, and a cap fixed to the hollow tube at said inlet end of the hollow tube assembly, said cap being formed with a hollow stem of smaller diameter than said hollow tube and engageable by said membrane when in a curved deformed condition.

16. The apparatus according to claim 15, wherein said cap is further formed with said passageway establishing communication between the inlet end of the stem and said inlet chamber when the membrane is in its flat undeformed condition.

17. The apparatus according to claim 16, wherein said cap is further formed with an annular recess for receiving said deformable membrane.

18. The apparatus according to claim 16, wherein said hollow tube is further formed with an annular flange on the outlet side thereof engageable with said piston.

19. The apparatus according to claim 18, wherein said spring is interposed between said flange and said housing for urging said movable valve assembly to its closed position with respect to said housing inlet.

* * * * *